US007027437B1

(12) United States Patent
Merchant et al.

(10) Patent No.: US 7,027,437 B1
(45) Date of Patent: *Apr. 11, 2006

(54) NETWORK SWITCH MULTIPLE-PORT SNIFFING

(75) Inventors: Shashank Merchant, Sunnyvale, CA (US); Robert Williams, Cupertino, CA (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 09/315,973

(22) Filed: May 21, 1999

(51) Int. Cl.
*H04L 12/56* (2006.01)

(52) U.S. Cl. ...................................... 370/389; 709/224

(58) Field of Classification Search ................ 370/218, 370/250, 252, 299, 352, 353, 367, 368, 371, 370/386, 388, 395.7, 400, 422
See application file for complete search history.

(56) References Cited

U.S. PATENT DOCUMENTS 5,319,644 A * 6/1994 Liang ......................... 370/452
5,515,376 A 5/1996 Murthy et al.
6,044,400 A * 3/2000 Golan et al. ................ 709/224
6,044,401 A * 3/2000 Harvey ....................... 709/225
6,058,102 A * 5/2000 Drysdale et al. ............ 370/252
6,058,112 A * 5/2000 Kerstein et al. ............ 370/389
6,108,782 A * 8/2000 Fletcher et al. ............. 713/153
6,112,241 A * 8/2000 Abdelnour et al. ......... 709/224
6,151,316 A * 11/2000 Crayford et al. ............ 370/356
6,157,623 A * 12/2000 Kerstein ..................... 370/315
6,185,214 B1 * 2/2001 Schwartz et al. ........... 370/401
6,233,613 B1 * 5/2001 Walker et al. ............. 709/224
6,310,860 B1 * 10/2001 Sheu et al. ................. 370/252
6,522,656 B1 * 2/2003 Gridley ...................... 370/428

OTHER PUBLICATIONS

Stelzer, E. E. et al. "Embedding RMON in large LAN switches". IEEE Network, Jan.-Feb. 1999, volumn 13, issue 1, pp. 63-72.*

* cited by examiner

*Primary Examiner*—Chi Pham
*Assistant Examiner*—Anh-Vu Ly

(57) ABSTRACT

A novel system and method of monitoring network activity in a network switching system having multiple ports for receiving and transmitting data packets, and a decision making engine for controlling data forwarding between the ports. Data blocks representing received data packets are placed in data queues corresponding to the receive ports. The data queues are transferred to logic circuitry for processing in accordance with a predetermined algorithm to determine destination information. At least one port for transmitting data packets is identified based on the destination information. In addition, a sniffer port selected among the plurality of ports is identified as a transmit port to provide output of data packets received or transmitted by multiple sniffed ports. A traffic capture mechanism that enables the sniffer port to output data transferred via multiple sniffed ports includes a sniffer port configuration circuit for selecting the sniffer port, and a sniffed port configuration circuit for selecting the multiple sniffed ports. The sniffer port configuration circuit may provide a signal to enable or disable monitoring of data traffic on the multiple sniffed ports.

18 Claims, 7 Drawing Sheets

NETWORK SWITCH MULTIPLE-PORT SNIFFING

FIELD OF THE INVENTION

This invention relates to data communication systems, and more particularly, to a system for analyzing network activity in a multiport network switch.

BACKGROUND ART

A network analyzer or sniffer may be employed in a data network for continuous monitoring of the network environment to generate alarms or reports when some thresholds such as error rates, percent utilization, percent idle time are exceeded. Network activity information such as percent network utilization may be captured in real time based on various parameters such as network traffic picks. Also, sniffer may gather statistics based on network activity, errors, protocols, frame sizes or traffic history routing, etc.

A conventional sniffer probe is connected to a single port of a communication device to sniff or monitor traffic via the port. However, in a multiport network switch, it would be desirable to provide a sniffing system that enables a sniffer or network-analyzing probe connected to a sniffer port to monitor receive and transmit traffic on multiple ports.

DISCLOSURE OF THE INVENTION

The invention provides a novel system and method of monitoring network activity in a network switching system having multiple ports for receiving and transmitting data packets, and a decision making engine for controlling data forwarding between the ports. Data blocks representing received data packets are placed in data queues corresponding to the receive ports. The data queues are transferred to logic circuitry for processing in accordance with a predetermined algorithm to determine destination information. At least one transmit port is identified based on the destination information. In addition, if the decision making engine determines that a given data packet is received by one of multiple sniffed ports or at least one of the sniffed ports is identified as a port for transmitting the data packet, a sniffer port is added to transmit ports to provide output of data packets received or transmitted by the sniffed ports.

In accordance with the present invention, the decision making engine includes a plurality of queuing devices corresponding to the plurality of ports for queuing data blocks representing the data packets received by the corresponding ports. Logic circuitry is responsive to the plurality of queuing devices for processing the data blocks in accordance with a prescribed algorithm to determine destination information. A forwarding circuit is responsive to the logic circuitry for identifying at least one transmit port. A traffic capture mechanism enables the sniffer port to output data transferred via multiple sniffed ports selected among the plurality of ports. For example, the sniffer port may be connected to a network-analyzing probe for monitoring data traffic on multiple sniffed ports.

In accordance with a preferred embodiment of the invention, the traffic capture mechanism comprises a sniffer port configuration circuit for selecting the sniffer port, and a sniffed port configuration circuit for selecting the multiple sniffed ports. The sniffer port configuration circuit may provide a signal to enable and disable monitoring of data traffic on the multiple sniffed ports. The sniffed port configuration circuit may store a sniffed port vector having a plurality of port bits corresponding to the plurality of ports. The port bits may be set into predetermined states to program at least one of the multiple sniffed ports.

The forwarding circuit, which generates a forwarding descriptor identifying transmit ports, may determine whether a port that received a data packet is one of the multiple sniffed ports. If so, the sniffer port data may be included into the forwarding descriptor.

Also, the forwarding circuit may determine whether destination information supplied to the forwarding circuit indicates that at least one of the sniffed ports is selected for transmission. If so, the sniffer port data may be included into the forwarding descriptor.

Various objects and features of the present invention will become more readily apparent to those skilled in the art from the following description of a specific embodiment thereof, especially when taken in conjunction with the accompanying drawings.

BEST MODE FOR CARRYING OUT THE INVENTION

Figure 1:
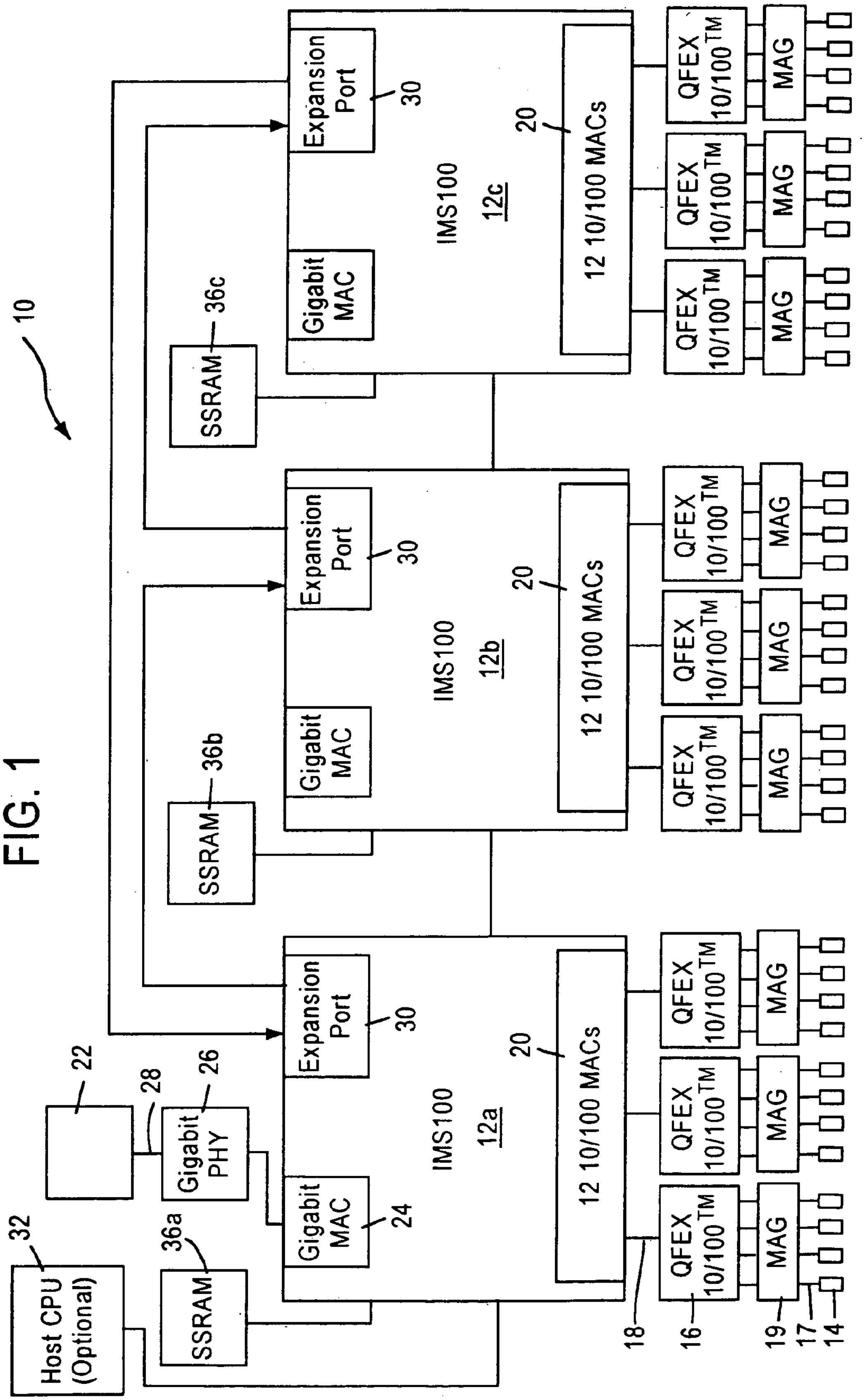
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
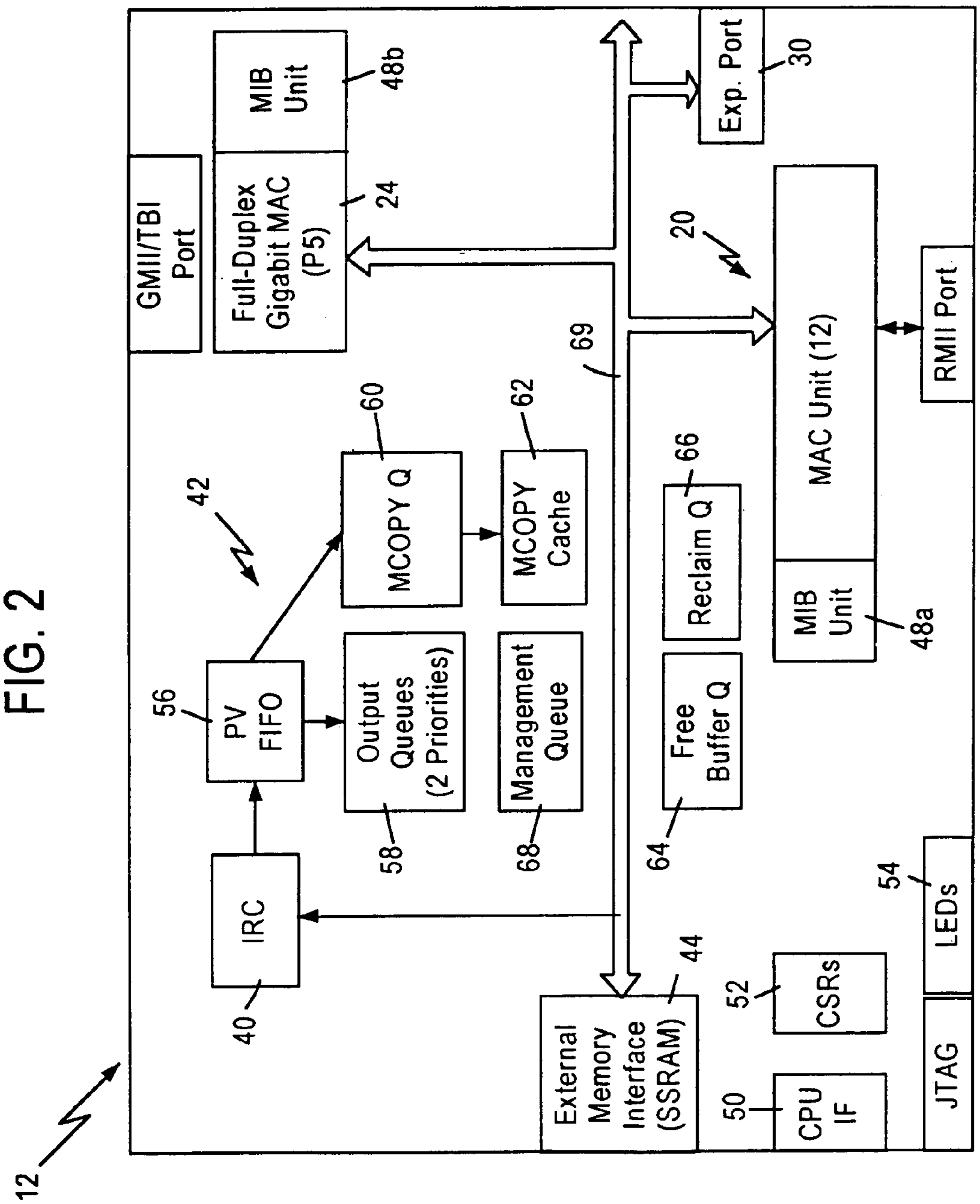
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48*a* and 48*b* (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The format of the forwarding descriptor will discussed further with respect to FIG. 7. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

Figures 3, 3A:
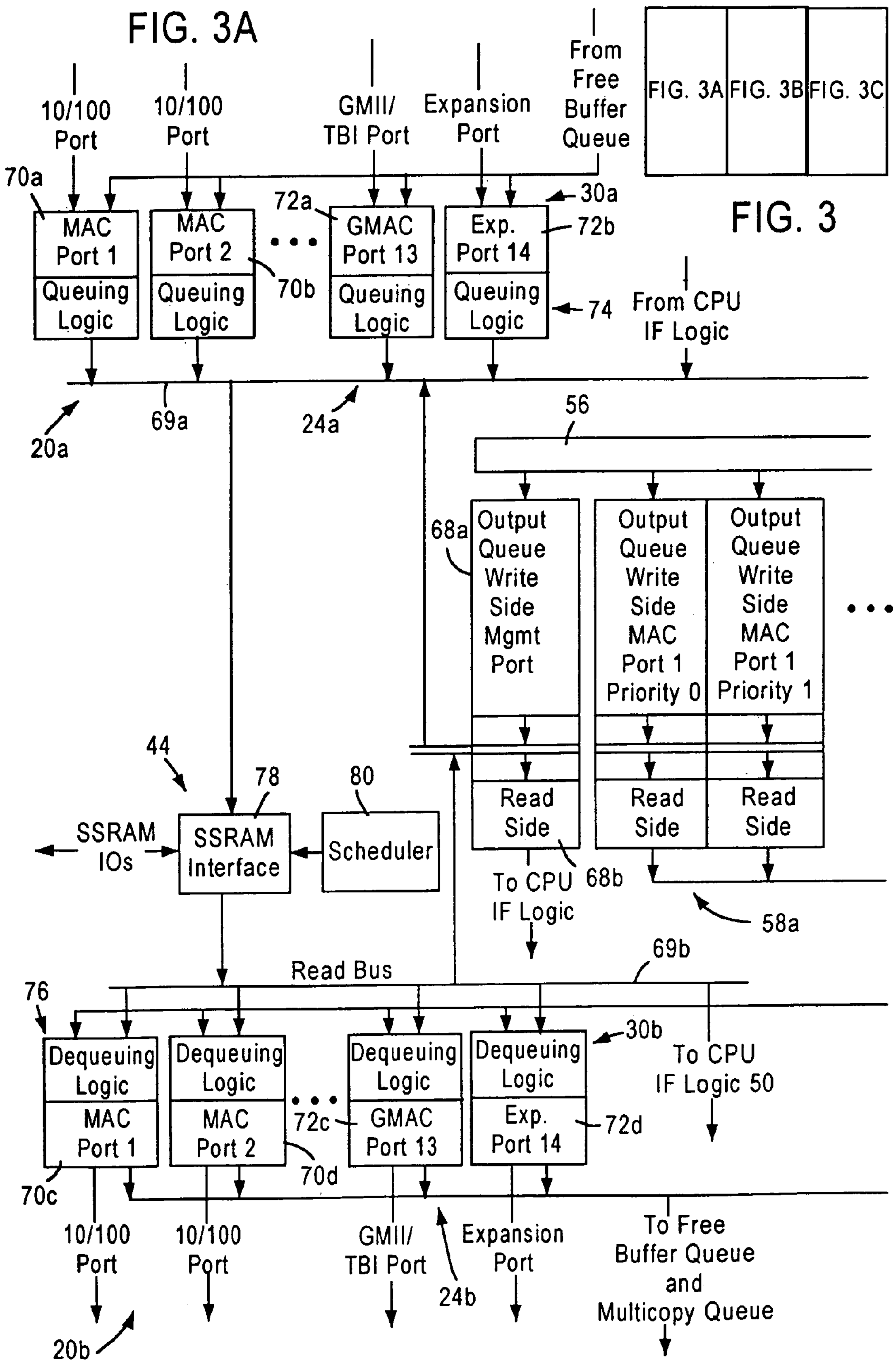
FIG. 3 is a block diagram illustrating in detail the switching subsystem of FIG. 2.
Figure 3B:
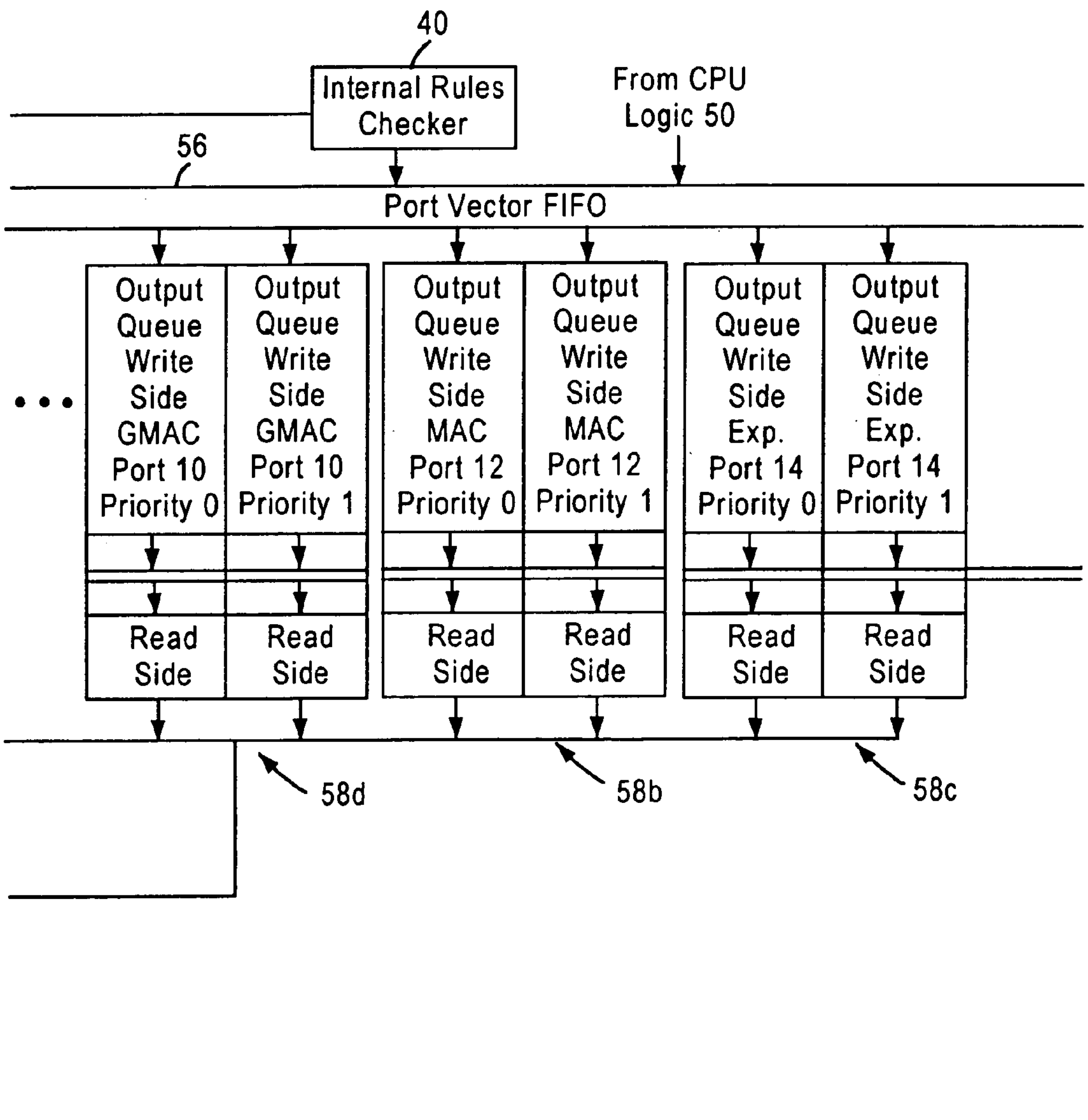
Figure 3C:
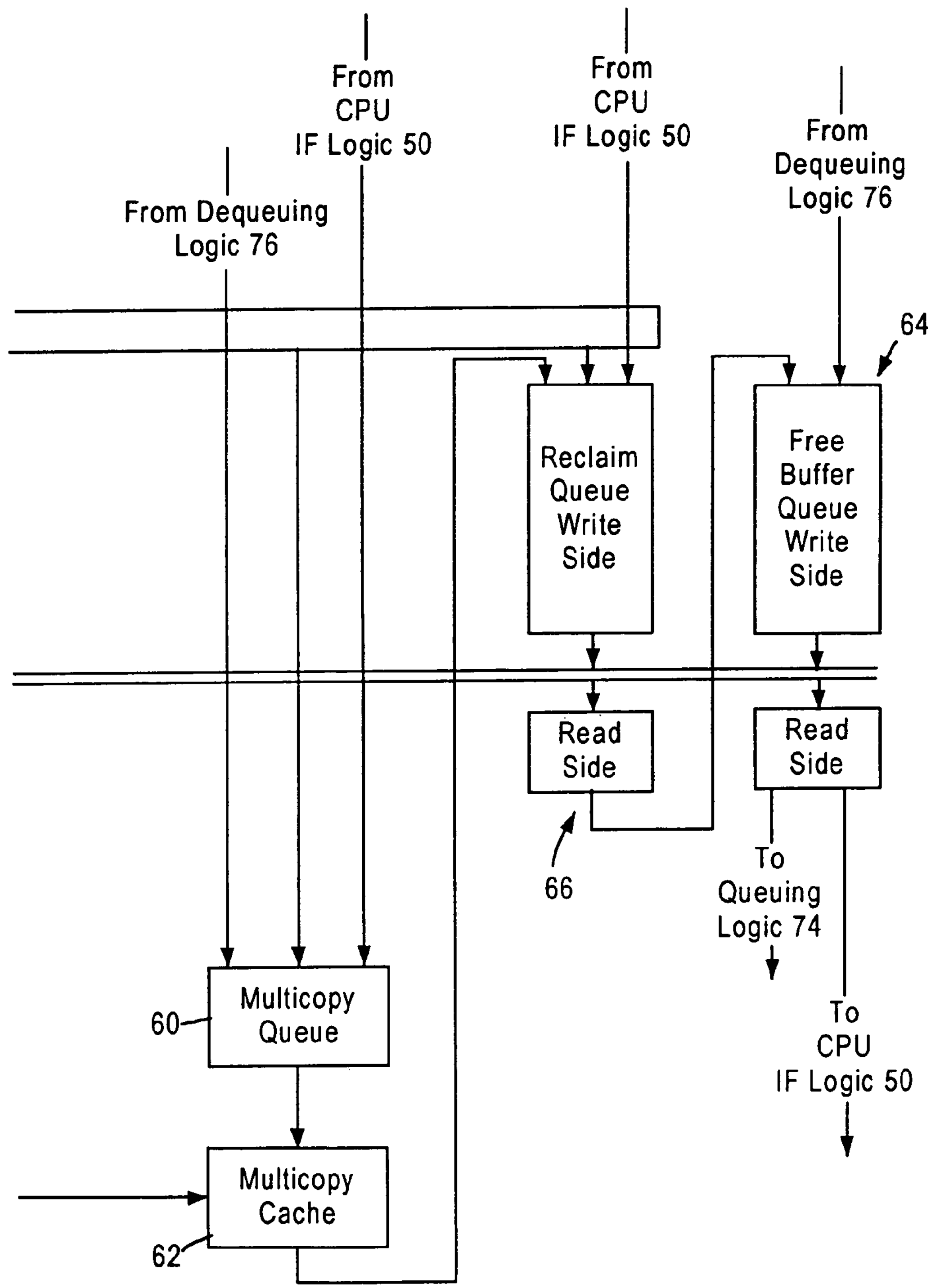

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20*a* and a transmit portion 24*b*. The receive portion 20*a* and the transmit portion 24*b* each include 12 MAC modules (only two of each shown and referenced by numerals 70*a*, 70*b*, 70*c*, and 70*d*) configured for performing the corresponding receive or transmit function according to IEEE 802.3 protocol. The MAC modules 70*c* and 70*d* perform the transmit MAC operations for the 10/100 Mb/s switch ports complementary to modules 70*a* and 70*b*, respectively.

The gigabit MAC port 24 also includes a receive portion 24*a* and a transmit portion 24*b*, while the expansion port 30 similarly includes a receive portion 30*a* and a transmit portion 30*b*. The gigabit MAC port 24 and the expansion port 30 also have receive MAC modules 72*a* and 72*b* optimized for the respective ports. The transmit portions 24*b* and 30*b* of the gigabit MAC port 24 and the expansion port 30*a* also have transmit MAC modules 72*c* and 72*d*, respectively. The MAC modules are configured for full-duplex operation on the corresponding port, and the gigabit MAC modules 72*a* and 72*c* are configured in accordance with the Gigabit Proposed Standard IEEE Draft P802.3z.

Each of the receive MAC modules 70*a*, 70*b*, 72*a*, and 72*b* include queuing logic 74 for transfer of received data from the corresponding internal receive FIFO to the external memory 36 and the rules checker 40. Each of the transmit MAC modules 70*c*, 70*d*, 72*c*, and 72*d* includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69*a* from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the % rite data bus 69*a*. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70*c*, 70*d*, 72*d*, and 72*c* has an associated output queue 58*a*, 58*b*, 58*c*, and 58*d*, respectively. In preferred embodiments, each of the output queues 58 has a high priority queue for high priority frames, and a low priority, queue for low priority frames. The high priority frames are used for frames that require a guaranteed access latency, e.g., frames for multi-media applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58*d* for the gigabit transmit MAC 72*c*. The dequeuing logic 76 for the transmit gigabit port 24*b* takes the frame pointer from the corresponding gigabit port output queue 58*d*, and issues a request to the scheduler 80 to read the frame data from the external memory 36 at the memory location specified by the frame pointer. The scheduler 80 schedules the request, and issues a grant for the dequeuing logic 76 of the transmit gigabit port 24*b* to initiate a DMA read. In response to the grant, the dequeuing logic 76 reads the frame data (along the read bus 69*b*) in a DMA transaction from the location in external memory 36 pointed to by the frame pointer, and stores the frame data in the internal transmit FIFO for transmission by the transmit gigabit MAC 72*c*. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20*b*, 24*b*, and/or 30*b*.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

As discussed above, the internal rules checker (IRC) 40 monitors the write bus to capture frame header information (including source, destination, and VLAN address information) and frame pointers associated with received frames. The IRC 40 uses the frame pointer value and the associated header information to determine which MAC ports will output the data frame stored at the location specified by the frame pointer.

Figure 4:
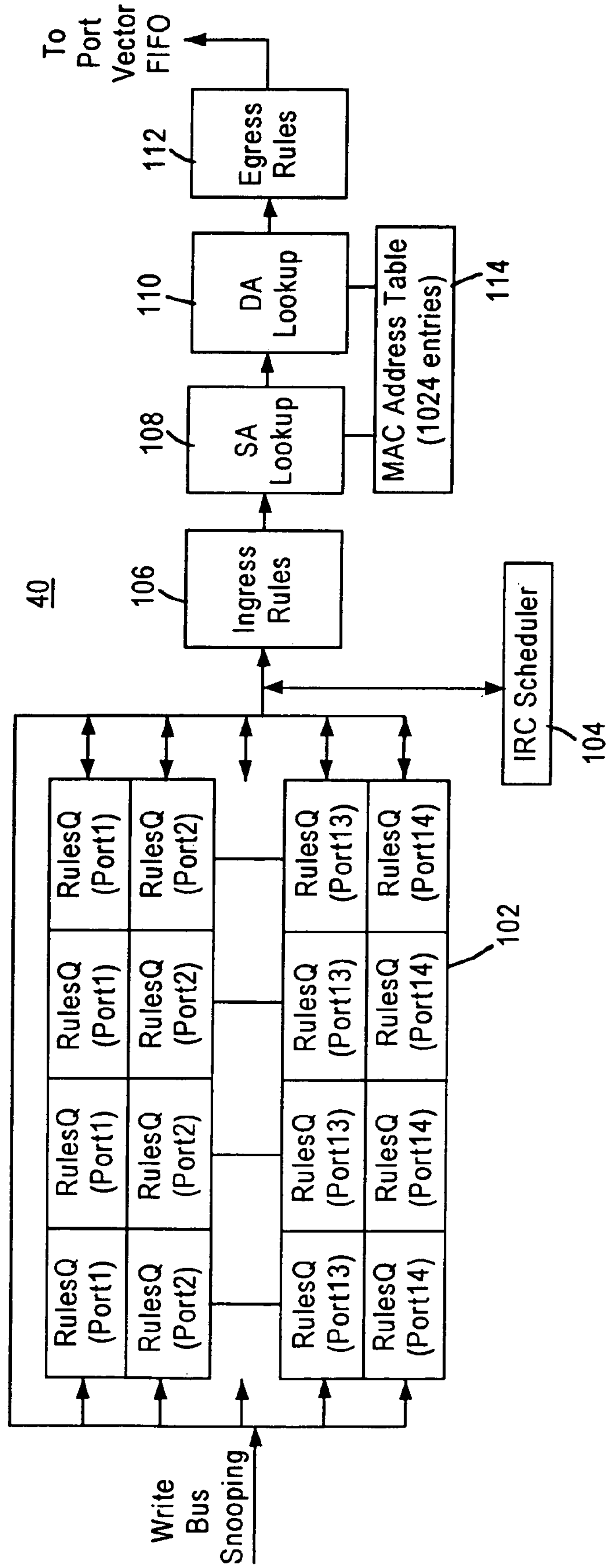
FIG. 4 is a block diagram of an internal rules checker (IRC) of the present invention.

As shown in FIG. 4, the IRC 40 may contain multiple rules queues 102 arranged for holding frame pointers and frame header information. A single rules queue 102 is assigned to each receive port of the IMS 12 for storing information associated with the frames received via the corresponding port. In particular, rules queues 1 to 12 may be provided for 10/100 MAC ports 1 to 12 configured to receive data from the corresponding 10/100 Mb/s network stations 14, a rules queue 13 may be arranged to support the gigabit MAC port 24 capable of receiving data from the gigabit network node 22, and a rules queue 14 may be assigned to the expansion port 30. In each rules queue 102, frame headers may be stored in a static random access memory (SRAM) having four 40-byte entries, and frame pointers may be stored in a SRAM having four 13-bit entries.

Frame headers and frame pointers from the rules queues 102 are transferred to IRC logic circuits such as ingress rules logic 106, source address (SA) lookup logic 108, destination address (DA) lookup logic 110 and egress rules logic 112 to produce a forwarding descriptor supplied to the port vector FIFO 56. The IRC scheduler 104 provides time slots for sequential transferring data held in the rules queues 102 to the IRC logic circuitry.

The ingress rules logic 106 detects whether a frame was received with an error and checks for preset DA and VLAN information. If an error is detected or the frame address information does not match with allocated DA addresses or VLAN data, the ingress rules logic 106 produces a forwarding descriptor with a null port vector. This forwarding descriptor is transferred directly to the port vector FIFO 56 without performing SA and DA lookup operations and egress rules operations.

The SA and DA lookup logic circuits 108 and 110 search an IRC address table 114 for entries associated with the MAC source and destination addresses for the corresponding frame. If source and destination address data of a frame match with the address table entries, the DA lookup logic circuit 110 supplies the frame header and pointer to egress rules logic circuit 112 with a port vector indicating ports corresponding to destination address data of the frame. The egress logic circuit 112 checks each transmit port in the port vector produced by the DA lookup logic circuit 110 to remove or mask the disabled ports, the ports that do not belong to a required VLAN, and the port from which the frame is received. Also, as discussed above, the egress logic circuit 112 performs a sniffing function to monitor data traffic on selected ports. As a result, the egress rules logic circuit 112 generates a forwarding descriptor including a port vector field identifying each MAC port that should receive the corresponding frame, a receive port field indicating the port from which the frame was received, and an operation code field containing instructions about how the frame should be modified before transmission. Also, the forwarding descriptor may contain fields indicating priority queues, VLAN identifiers, the location of the frame in the external memory, etc.

The port vector field may be a 15-bit map that indicates to which port or ports the frame should be transferred. For example, bit 0 may correspond to the management port (port 0), bits 1–12 may correspond to 10/100 ports 1–12, bit 13 may correspond to the gigabit port 24 and bit 14 may correspond to the expansion port 30.

Figure 5:
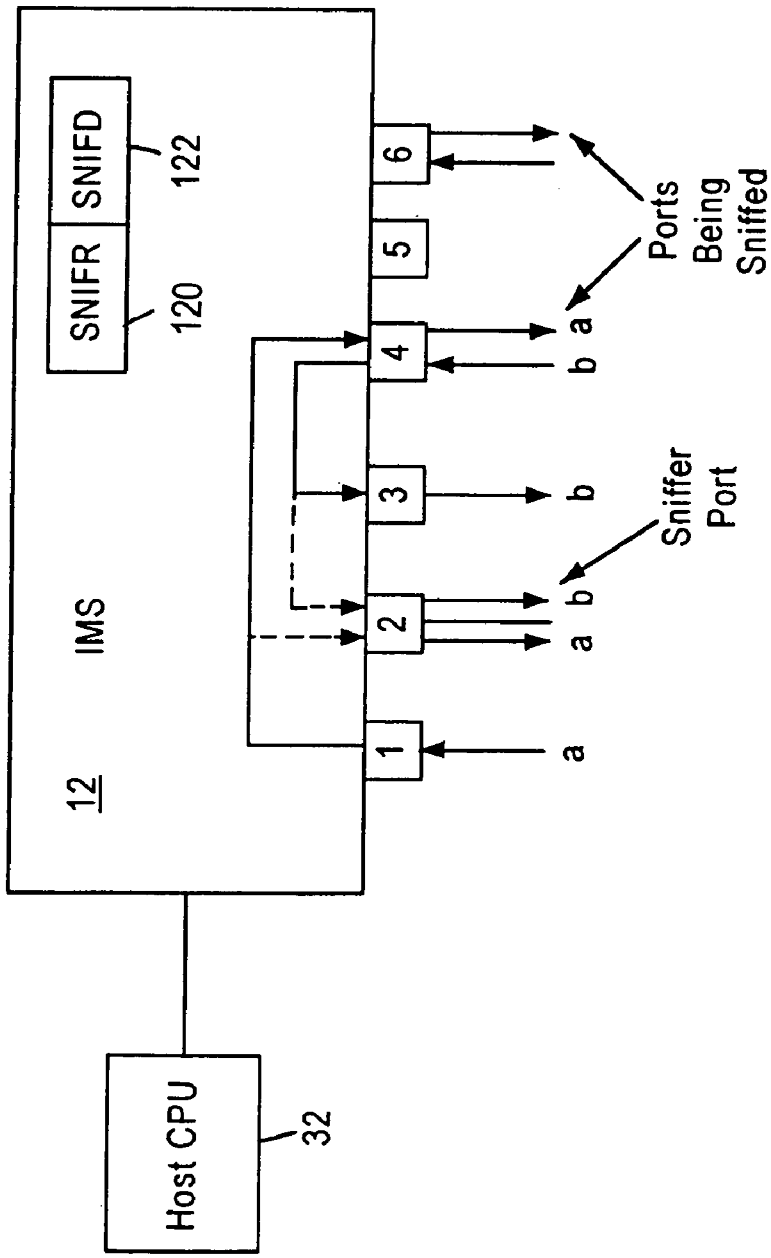
FIG. 5 is a diagram illustrating a sniffer port traffic capture mechanism of the present invention.

In accordance with the present invention, the egress rules logic 112 provides a sniffer port traffic capture mechanism, which allows a network analyzing probe connected to a port designated as the sniffer port to monitor or sniff network activity on multiple ports designated as the sniffed ports. As shown in FIG. 5, the sniffer port traffic capture mechanism comprises a sniffer port configuration (SNIFR) register 120 and a sniffed port configuration (SNIFD) register 122.

The SNIFR register 120 configures a sniffer port to receive all receive and transmit traffic from a set of sniffed ports. For example, as shown in FIG. 5, the port 2 may be configured as the sniffer port, and ports 4 and 6 may be designated as the sniffed ports. The SNIFR register 120 contains a 4-bit sniffer port field identifying the sniffer port. For example, when the sniffer port field contains 0000, the management queue 68 may be designated to be the sniffer port. Binary combinations 0001 to 1110 in the sniffer port field may configure one of ports 1 to 14, respectively, as the sniffer port.

In addition, the SNIFR register 120 contains a sniff enable bit, which enables or disables the sniffer function. When the sniff enable bit is set, the sniffer port traffic capture mechanism is enabled. When the sniff enable bit is reset, the sniffer port traffic capture mechanism is disabled.

The SNIFD register 122 contains a 14-bit sniffed port vector that configures a set of sniffed ports. Each bit of the sniffed port vector corresponds to one of the fourteen ports of the IMS 12. For example, bits 1 to 14 may correspond to ports 1 to 14, respectively, of the IMS 12. To designate a set of ports as the sniffed ports, the corresponding bits of the sniffed port vector may be set. Thus, multiple ports of the IMS 12 may be configured as sniffed ports.

When the sniff enable bit and one or several bits of the sniffed port vector are set, data received and transmitted by the corresponding sniffed ports are also transferred to the sniffer port indicated in the SNIFR register 120.

In particular, when the sniff enable bit is set, the egress rules logic circuit 112 producing a forwarding descriptor inspects the receive port number and the port vector for each frame. If the receive port number or any of the ports identified in the port vector supplied to the egress logic circuit 112 corresponds to one of the sniffed ports programmed in the SNIFD register 122, the egress logic circuit 112 adds the sniffer port programmed in the SNIFR register 120 to the port vector field of the forwarding descriptor. Then the egress logic circuit 112 transfers the produced forwarding descriptor to the port vector FIFO 56. The port vector field is examined by the port vector FIFO 56 to determine which particular output queues correspond to the sniffer port and other ports selected for transmission, and should receive the associated frame pointer. The port vector FIFO 56 places the frame pointer into the top of the corresponding queues 58 or 68. Thus, data frames received or transmitted by sniffed ports will be copied to the sniffer port. As a result, a network-analyzing probe connected to the sniffer port is enabled to monitor all data frames received or transmitted by any of sniffed ports.

An example of the sniffer port traffic capture mechanism of the present invention is shown in FIG. 5, wherein port 2 is the sniffer port, and ports 4 and 6 are selected to be the sniffed ports. To program port 2 as the sniffer port, binary combination "0010" may be written into the sniffer port field of the SNIFR register 120. To program ports 4 and 6 as the sniffed ports, bits 4 and 6 of the sniffed port vector in the SNIFD register 122 may be set.

For example, when the sniff enable bit in the SNIFR register is set, frame "a" received by port 1 and directed to sniffed port 4 for transmission is copied to sniffer port 2. Frame "b" received by sniffed port 4 and directed to port 3 for transmission is also copied to sniffer port 2. Similarly, frames received by sniffed port 6 or directed to sniffed port 6 for transmission are copied to sniffer port 2.

Thus, the present invention allows a probe connected to the sniffer port of the IMS 12 to monitor data frames received and transmitted by multiple ports of the IMS 12.

In this disclosure, there are shown and described only the preferred embodiments of the invention, but it is to be understood that the invention is capable of changes and modifications within the scope of the inventive concept as expressed herein.

What is claimed is:

1. A multiport data communication system for transferring data packets between ports, the data communication system comprising:

a plurality of ports for receiving and transmitting the data packets, and a decision making engine responsive to received data packets for directing the received data packets to the ports selected for transmission of the received data packets, the decision making engine including:

a forwarding circuit responsive to the received data packets for identifying at least one transmit port, and a traffic capture mechanism for enabling one port of said plurality of ports to output data transferred via multiple other selected ports of said plurality of ports, said traffic capture mechanism having a monitored port configuration circuit for selecting the multiple other ports among said plurality of ports, said monitored port configuration circuit is configured for storing a port vector having a plurality of port bits corresponding to said plurality of ports.

2. The system of claim 1, wherein said one port is a sniffer port for connecting to a probe for monitoring data traffic, and said multiple other selected ports are multiple sniffed ports monitored by the probe via the sniffer port.

3. The system of claim 2, wherein said traffic capture mechanism comprises a sniffer port configuration circuit for selecting the sniffer port among said plurality of ports.

4. The system of claim 3, wherein said sniffer port configuration circuit is configured to enable and disable monitoring of data traffic on the multiple sniffed ports.

5. The system of claim 1, wherein the port bits are set into predetermined states to select at least one of the multiple other ports.

6. The system of claim 1, wherein the forwarding circuit is configured to generate a forwarding descriptor identifying the ports for transmitting the data packets.

7. The system of claim 6, wherein the forwarding circuit is configured to include sniffer port data into the forwarding descriptor, if the port that received the data packet is one of the multiple other selected ports.

8. The system of claim 6, wherein the forwarding circuit is configured to determine whether destination information supplied to the forwarding circuit indicates that at least one of the multiple other selected ports is selected for transmission of a data packet.

9. The system of claim 8, wherein the forwarding circuit is configured to include sniffer port data into the forwarding descriptor, if at least one of the multiple other selected ports is selected for transmission of the data packet.

10. The system of claim 1, wherein said forwarding circuit is configured to determine whether a port that received a data packet is one of said multiple other selected ports.

11. The system of claims 1, wherein the decision making engine further comprises a plurality of queuing devices corresponding to the plurality of ports for queuing data blocks representing the data packets received by the corresponding ports, and logic circuitry responsive to the plurality of queuing devices for processing the data blocks in accordance with a prescribed algorithm to determine destination information.

12. In a communication network having a plurality of ports and a decision making engine for controlling data forwarding between the ports, a method of monitoring network activity, comprising the steps of:

placing data blocks representing received data packets in a plurality of data queues to be processed by the decision making engine, processing the data queues by logic circuitry in accordance with a prescribed algorithm to determine destination information, identifying at least one port for transmitting data packets based on the destination information, selecting multiple sniffed ports among the plurality of ports for monitoring the data packets transferred via the sniffed ports, and selecting a sniffer port among the plurality of ports to provide output of the data packets transferred via the sniffed ports, wherein the step of selecting the sniffed ports comprises storing a sniffed port vector having a plurality of port bits corresponding to the plurality of ports.

13. The method of claim 12, wherein the sniffer port is identified as at least one of the ports for transmitting the data packet, if the port that received the data packet is one of the multiple sniffed ports.

14. The method of claim 12, wherein the step of identifying at least one port for transmitting data packets comprises determining whether the destination information indicates that at least one of the multiple sniffed ports is selected for transmitting a data packet.

15. The method of claim 14, wherein the sniffer port is identified as a port for transmitting the data packet, if at least one of the multiple sniffed ports is selected for transmitting the data packet.

16. The method of claim 12, wherein the step of identifying at least one port for transmitting data packets comprises determining whether a port that received a data packet is one of the multiple sniffed ports.

17. A multiport data communication system for transferring data packets between ports, the data communication system comprising:

a plurality of ports for receiving and transmitting the data packets, a forwarding circuit responsive to received data packets for identifying at least one transmit port, and a traffic capture mechanism for enabling one port of said plurality of ports to output data transferred via multiple other selected ports of said plurality of ports, said forwarding circuit being configured to generate a forwarding descriptor identifying ports for transmitting the data packets, the forwarding descriptor including sniffer port data identifying said one port, if at least one of said multiple other selected ports is selected for transmitting a data packet.

18. The system of claim 17, wherein a port that received the data packet is one of the multiple other selected ports.

* * * * *